United States Patent [19]

Losehand

[11] 4,081,619
[45] Mar. 28, 1978

[54] SWITCHING ARRANGEMENT FOR TELECOMMUNICATION SUBSCRIBER STATIONS USING KEY-OPERATED SELECTION UNITS

[75] Inventor: Helmut Losehand, Dachau, Germany

[73] Assignee: Siemens Aktiengesellschaft, Munich, Germany

[21] Appl. No.: 724,096

[22] Filed: Sep. 17, 1976

[30] Foreign Application Priority Data

Sep. 19, 1975 Germany .............................. 2541903

[51] Int. Cl.² ........................................... H04M 1/272
[52] U.S. Cl. .............................. 179/90 K; 179/81 R
[58] Field of Search .............. 179/90 R, 90 K, 16 EC, 179/81 R

[56] References Cited

U.S. PATENT DOCUMENTS

| 3,761,640 | 9/1973 | Monin | 179/90 R |
| 3,856,982 | 12/1974 | Lawson et al. | 179/90 R |
| 3,969,592 | 7/1976 | Pipitone et al. | 179/90 R |
| 3,973,084 | 8/1976 | Houland | 179/90 K |

FOREIGN PATENT DOCUMENTS

| 2,437,038 | 2/1976 | Germany | 179/90 K |
| 2,210,852 | 9/1973 | Germany | 179/90 K |
| 1,440,542 | 6/1976 | United Kingdom | 179/90 K |

*Primary Examiner*—Kathleen H. Claffy
*Assistant Examiner*—Randall P. Myers
*Attorney, Agent, or Firm*—Schuyler, Birch, Swindler, McKie & Beckett

[57] ABSTRACT

A switching arrangement by which a telecommunication subscriber station selection unit is connected into the central office line is described. The selection unit involved is of the key-operated type wherein key actuation produces a specific surge current corresponding to the specific key depressed. Semiconductor elements form impulse contacts which are operated by a key-controlled pulse generator. A bistable relay is provided for disabling the station's speech circuit during the dialing phase, and at the same time maintains a transmission and feeder circuit, of which the selection unit forms a part and which is completed by actuation of a key. The operation of the bistable relay is influenced via a parallel circuit which offers a high impedance to the transmission and feeder circuit, so that the bistable relay can be rendered inoperative if it is erroneously in an operative state. Depression of a key is required to close the transmitter and feeder circuit, and when this occurs, i.e., during the dialing phase, the aforementioned parallel circuit no longer can affect the operation of the bistable relay.

4 Claims, 1 Drawing Figure

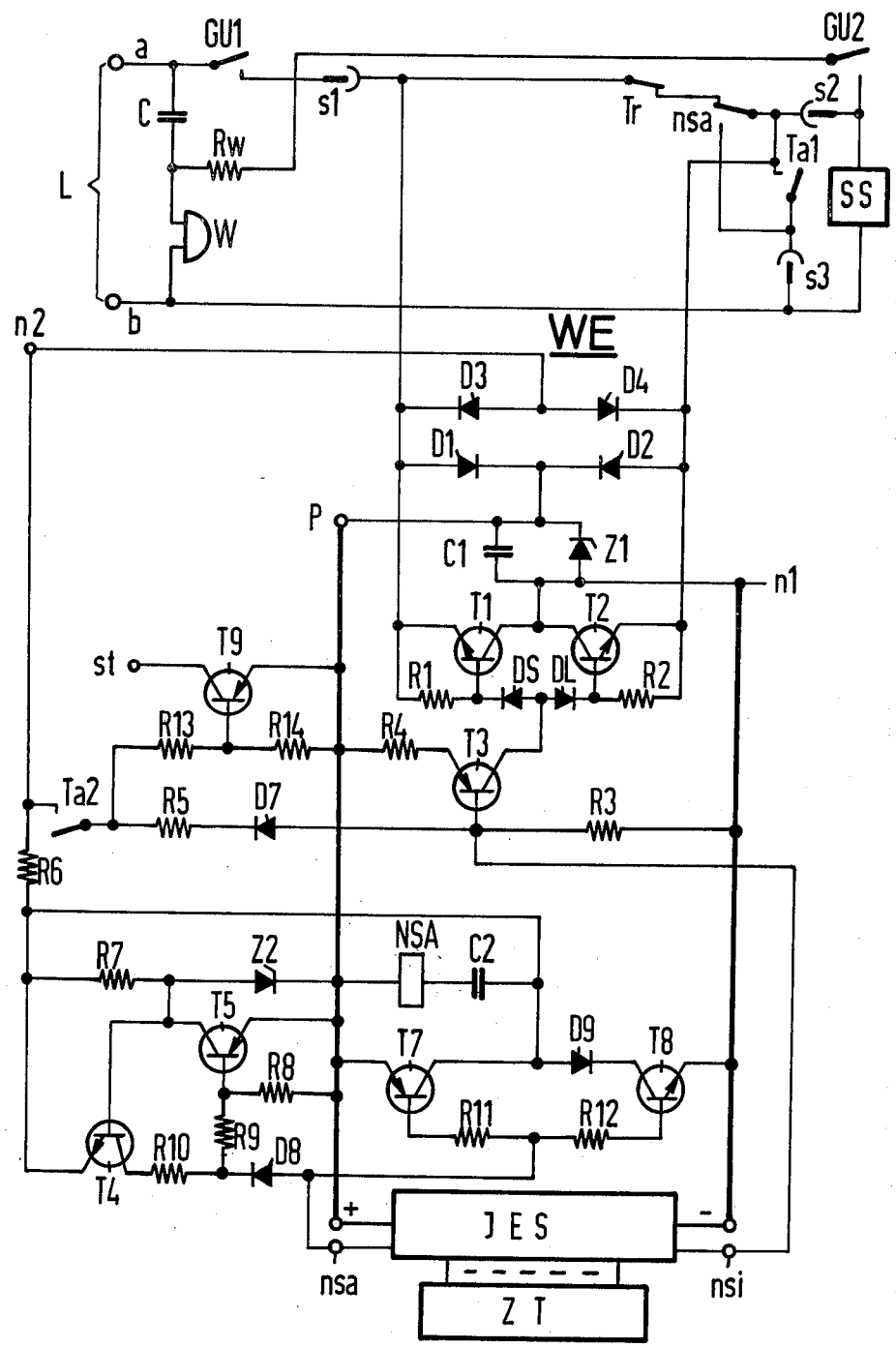

SWITCHING ARRANGEMENT FOR TELECOMMUNICATION SUBSCRIBER STATIONS USING KEY-OPERATED SELECTION UNITS

BACKGROUND OF THE INVENTION

The invention relates to a switching arrangement for telecommunication subscriber stations with key-operated selection units which drive central office line by switching in charge storages.

More particularly, the selection unit is a three terminal device which selects a series of surge currents, and is replaceable by other selection units. An impulse contact controlled by an electronic pulse generator circuit is formed by a semiconductor-controlled element, e.g., a transistor, and a bistable relay disables the speech circuit of the subscriber station throughout the duration of the dialing phase, and instead, maintains the transmitter and feeder circuit of which the selection unit is a part and is completed by depressing one of the keys of the selection unit.

An arrangement of the type described above is exemplified by the apparatus described in West German Offenlegungsschrift 2,210,852. In addition to its compatibility with other selection units because of the three point terminal, this arrangement is particularly advantageous because of its low power requirements, since the control of the bistable relay and of the impluse switch in the form of a semiconductor element requires only very little energy.

Bistable relays, however, are susceptible to shocks and may in fact be switched by vibrations. The use of such relays for switching from the speech phase to the dialing phase and vice versa thus requires additional steps so as to ensure that upon entry into service of the station the speech phase prevails. Such a solution is exemplified by West German Auslegeschrift 2,258,839, according to which additional cradle switches and additional terminals are needed for the selection unit, so that there is no compatibility with other prior art selection units.

A switching arrangement is known (cf. West German Pat. Application P 25,23,478.0) wherein the automatic return of the bistable relay after entry into service of the station is under the control of an integrated keysender module. However, this requires that the loop current flowing after entry into service of the station is adequate for the operation of the selection unit. Without the use of a voltage divider this requisite condition is not met if, for example, in the switching center high resistance line monitoring circuits are employed that do not respond upon switching of the selection unit.

SUMMARY OF THE INVENTION

In accordance with the invention, the problems described hereinabove are avoided in that the bistable relay, after entry into service of the station, can be influenced via a parallel circuit which is highly resistive to the feeded and transmitter circuit of the selection unit and can be switched to the initial position if it is in the operative position. The feeder and transmitter circuit is closed only with the first key depression, and the influence of the parallel circuit on the bistable relay is repressed for the duration of the dialing phase of the selection unit.

By separating the resetting of the bistable relay upon entry into service of the station from the activation of the actual feeder and transmitter circuit of the selection unit the energy for the relay can be processed much more easily, since the other components of the selection unit no longer exist as a load. The selection unit is enabled with the first depression of a key and, thus, only at a time when in the switching center the line monitoring circuit has detected the closed loop and is changed over to a receiving unit for dial pulses with low-resistance line feeding.

Preferably, a capacitor connected in series with the bistable relay is charged over the parallel circuit upon entry into service of the subscriber station and, after a given threshold voltage has been attained, the capacitor is discharged with a sudden change of load over the relay, switching it to the idle condition if it is in the operative position.

Preferably, the discharge of the capacitor over the bistable relay occurs through two transistors connected as a unijunction transistor which are turned off for the duration of the dialing phase of the pulse generator circuit.

The supply of energy to the selection unit may occur in a manner in itself known via a bridge rectifier for protecting against reverse voltages, the parallel circuit being likewise disposed at the output of the bridge rectifier for the resetting of the bistable relays.

Another significant development in accordance with the invention is that the feeding of the selection unit occurs over a double bridge rectifier wherein two bridge arms are shared by both bridges, one of which feeds in the known manner the main charge storage of the selection unit, while the other supplies gate voltage for the resetting of the bistable switching element to the quiescent state upon entry into service of the station. The bridge arms forming together with the two common bridge arms the bridge for the main feeding of the selection unit comprise semiconductor-controlled switches e.g., transistors, of which after alternation of polarity the effective semiconductor switch operates as an impulse contact. By installing the semiconductor impulse contact in the bridge protecting against reverse voltages, there is no need for a semiconductor path in the feeder circuit, so that the magnitude of the available voltage is increased accordingly, and the use of voltage dividers is thus rendered unnecessary.

According to a further development of this solution there is provided for the control of the impulse semiconductor switch another semiconductor-controlled switch whose control terminal is connected in parallel with the main charge storage and which may be biased into conduction via a common pushbutton contact of the digital keyboard and the second bridge independently of the load of the main charge storage.

The pushbutton contact causing the feeder and transmitter circuit to be switched through may also be utilized for the easy initiation of other switching processes.

BRIEF DESCRIPTION OF THE DRAWING

The principles of the invention will be more readily understood by reference to the description of a preferred embodiment given hereinbelow and illustrated in schematic form in the accompanying drawing.

DETAILED DESCRIPTION OF THE DRAWING

In the preferred embodiment the subscriber circuit includes a speech circuit SS that can be connected to both wires a and b of central office line L is provided. Also in the subscriber circuit is a ringing circuit comprising a capacitor C and a ringer W. Further, there is a selection unit or pushbutton dialing unit WE which is switchable into the subscriber circuit via a three-pole connector having terminals s1 to s3. These terminals are so arranged that with a minimum number of contacts the selection unit can be replaced by differently operating devices. The subscriber circuit is connected (in a manner itself known and therefore not shown) to a central office, by way of the lines a and b of the central office line L.

The key selection unit comprises the following units: the keyset ZT, pulse generator circuit JES for the series of surge currents allocated to the individual keys, transistors T1 and T2 operating as impulse contacts and controlled by transistor T3, a charge storage unit having a Zener diode Z1 and a capacitor C1, bistable relay NSA which, in series with a capacitor C2, is controlled by transistors T7 and T8 and by transistors T4 and T5 connected as unijunction transistors as well as transistor T9 which operates to initiate other switching functions responsive to actuation of a common pushbutton contact Ta2.

Other common pushbutton contacts of the digital keyboard ZT are marked Tr and Ta1, which may also be combined as a changeover contact. The changeover contact nsa of the bistable relay NSA and the common pushbutton changeover contact would then form a series connection, whereby the normally-closed contacts close the electrical connection of the wire a as a chain of contacts, while the speech circuit SS is thereby shorted.

When the station is put into operation the cradle switch is operated with its contacts GU1 and GU2, the speech circuit SS is connected to the central office in the known manner, and, moreover, the resistor Rw in series with the ringing capacitor C is connected in parallel with the contacts in the wire a as a spark-quench. The operation of the cradle changeover contacts remains without effect on the selection unit WE if the contact nsa is in its quiescent state, since the selection unit is then shorted by the contact Tr in series with the contact nsa. With that the subset is in its speech phase. If the contact nsa is in the operative position and, hence, is switched erroneously to the dialing phase, the speech circuit SS is shorted and instead the selection unit WE connected to the central office line.

The supply of energy to the selection unit WE occurs via a double bridge rectifier having diodes D1 and D2 as common arms for both bridges. The diodes form with the transistors T1 and T2 as impulse contacts one bridge and with the diodes D3 and D4 the other bridge. The main supply to the selection unit and, with that, the charging of the main charge storage C1 disposed between the two potential leads p and nl occurs via the bridge with the impulse contacts. As long as the capacitor C1 is not charged, the transistor T3 and, thereby, the pulse transistors T1 and T2 are turned off, so that the capacitor C1 cannot be charged even if the selection unit is connected to the central office line. The resetting of the bistable relay NSA upon entry into service of the station and conduction of the transistor T3 after pushbutton operation of the keyset ZT is caused via the other bridge having the diodes D1 to D4.

Hence, if upon entry into service of the station, the bistable relay NSA is not in the quiescent state, so that the selection unit, instead of the speech circuit SS, is connected to the central offic line L, the capacitor C2 in series with the relay NSA is charged via the negative potential lead n2 and the high-value resistor R6. The monitoring circuit connected in parallel with the capacitor and the relay coil and having the Zener diode Z2, the resistors R7 to R10 and the transistors T4 and T5, monitors the voltage across the capacitor C2. As soon as the voltage defined by the Zener voltage of the Zener diode Z2 and the threshold voltage of the transistor T4 is attained, the transistors T4 and T5 become conductive, and the capacitor C2 is discharged with a sudden change of load via the relay NSA. Owing to the charging current flowing therein, the relay NSA is switched to the initial position and, with that, the speech phase is reestablished, with the transistors T4 and T5 operating as a unijunction transistor.

If, assuming existence of the operating condition, one of the keys of the keyset ZT is depressed, the speech circuit SS is shorted with the contact Ta1 and, instead, the selection unit is looped into the central offic line. Further, the transistor T3 is easily biased into conduction via the common key contact Ta2 and the second rectifier bridge, so that either transistor T1 or transistor T2 in the other bridge also becomes conductive, and, thereby, the main charge capacitor C1 is charged. With increasing charge of the capacitor C1 the transistor T3 is driven completely into saturation via the resistor R3 so that the transistor T1 or T2 is also fully saturated and, with that, the actual feeder and transmitter circuit of the selection unit is completed.

In a manner known from prior art and now shown herein, the pulse generator circuit JES is set to a starting condition, and is thus ready for use. Accordingly, a signal appears at the output nsa that persists until all digits introduced over the keyset ZT have been transmitted in the form of series of current surges, so there is no need for adjustment because the feeder and transmitter circuit has been opened. The signal nsa switches the bistable relay NSA via the transistor T8 to the operative position marking the dialing phase. The associated sole contact nsa is reversed, thus bridging the common key contact Ta1, so that the dialing phase is sustained regardless of whether the pushbutton operation is continued or not. Further, reverse voltage is applied to the base of the transistor T5 via the diode D8, so that the capacitor C2 is prevented from discharging and, consequently, the relay NSA cannot be switched as long as dial pulses are transmitted. The drive pulses appearing in the operating condition at the output nsi of the pulse generator circuit turn off the transistor T1 or T2 acting as impulse contacts as the keyed figures appear and disappear and transmit in this manner the routing information over the central office line to the switching center not shown herein. During the times when the pulse transistor is turned off, the capacitor C1 provides the current supply for the selection unit WE.

As soon as all the digits introduced in the selection unit have been transmitted, it returns to the idle condition. As evidence thereof, the transistor T8 becomes non-conductive and the transistor T7 becomes conductive, and the capacitor C2 discharges over the bistable relay NSA, thereby switching said relay to the initial position. With the return of the contact nsa to the idle condition the speech circuit is again enabled, and the selection unit WE is again disabled.

With the saturation of the bridge circuit comprising the transistors T1 and T2 by the common key contact Ta2 there is also the possibility of initiating other control functions via the transistor T9 at the lead st. Thus, key contact can be multiply utilized. Also, by further measures one can ensure that a break of the loop current during the dialing phase (for example, because the subscriber receives the busy signal or has dialed wrongly, thereby actuating the cradle switch so as to cause a connection release) is detected. However, one must ensure that only loop current interruptions lasting longer than the normal loop interruptions caused by the pulsing are analyzed and cause the return to the speech phase. Wrong dialing due to digits that are still stored are thus prevented, since with each switchover to the dialing phase the pulse generator circuit JES is readjusted, thereby erasing stored digits before digits are again accepted by the keyset.

The principles of this invention are described hereinabove by describing the construction and operation of a preferred embodiment. It is to be remembered that the described embodiment is only exemplary, and its structural arrangement, as well as the specific components used, can be modified or changed while remaining within the scope of the invention as defined by the appended claims.

I claim:

1. In a switching arrangement for subscriber stations of a telephone system each fed via the central office line thereof and each having a key-controlled dialing unit with three terminals for connection to the central office line and for ready replacement of a dialing unit, said dialing unit having impulse contacts formed by a semiconductor controlled unit, a transmission and feed circuit established upon depression of one of the keys thereof, and a bistable relay operable to its operative state when a key is depressed to disconnect the subscriber speech circuit from the central office line and connect the dialing unit thereto, the improvement comprising a high resistance operating circuit incuding actuating means for said bistable relay connected in parllel to said transmission and feed circuit and operable to change the relay to its quiescent condition if it is in its operating condition upon actuation of the station, and means for inhibiting said operating circuit from returning the relay to its quiescent condition upon first depression of a key and thereafter for the duration of the dialing operation.

2. The switching arrangement defined in claim 1 wherein said operating circuit includes;
   first charge storage means,
   means for supplying energy to said first charge storage means upon actuation of the subscriber station and
   means for discharging said first charge storage means over said actuating means, whereby said bistable relay means is switched from the operative to the quiescent state.

3. The switching arrangement defined in claim 2 wherein the discharge path through said actuating means includes first switch means operable to open-circuit the discharge path during the dialing phase forming said inhibiting means.

4. The switching arrangement defined in claim 1 further comprising:
   first and second bridge circuit means having, respectively, first and second arms, said first and second arms of both bridge circuits, respectively, being common components,
   a power source,
   said first bridge circuit connecting said power source to said operating circuit,
   second charge storage means for supplying impulses responsive to actuation of keys of said dialing unit,
   said second bridge circuit connecting said second charge storage means to said power source and having third and fourth arms formed, respectively, by second and third switch means forming impulse contacts alternately connecting said second charge storage means to the central office line.

* * * * *